(12) United States Patent
Chang et al.

(10) Patent No.: US 8,363,018 B2
(45) Date of Patent: Jan. 29, 2013

(54) INTEGRATED TOUCH PANEL AND METHOD FOR MAKING SAME

(75) Inventors: Chun-Jong Chang, Hsinchu (TW);
Kuei-Sheng Tseng, Hsinchu (TW);
Ming-Chang Shih, Hsinchu (TW)

(73) Assignee: AU Optronics Corporation, Hsinchu (TW)

( * ) Notice: Subject to any disclaimer, the term of this patent is extended or adjusted under 35 U.S.C. 154(b) by 966 days.

(21) Appl. No.: 12/383,093

(22) Filed: Mar. 19, 2009

(65) Prior Publication Data
US 2010/0238122 A1 Sep. 23, 2010

(51) Int. Cl.
*G09G 5/00* (2006.01)

(52) U.S. Cl. .......... 345/173; 345/174; 345/178; 345/98; 345/100; 345/204

(58) Field of Classification Search .......... 345/87, 345/89, 107, 173–179, 204–205
See application file for complete search history.

(56) References Cited

U.S. PATENT DOCUMENTS

| | | | | |
|---|---|---|---|---|
| 4,928,158 A * | 5/1990 | Kimata | ............ | 257/231 |
| 5,060,245 A * | 10/1991 | Nelson | ............ | 377/60 |
| 5,202,908 A | 4/1993 | Hatada | | |
| 5,227,887 A | 7/1993 | Dohi et al. | ............ | 358/213.27 |
| 5,317,406 A | 5/1994 | Kobayashi et al. | ........... | 348/307 |
| 5,784,384 A | 7/1998 | Maeno | | |
| 5,838,308 A * | 11/1998 | Knapp et al. | ............ | 345/173 |
| 6,295,046 B1 | 9/2001 | Hebiguchi | | |
| 6,621,886 B2 | 9/2003 | Kawahata | ............ | 377/1 |
| 6,721,010 B1 * | 4/2004 | Chen et al. | ............ | 348/322 |
| 7,012,644 B1 | 3/2006 | Herrera E. | ............ | 348/294 |
| 7,522,149 B2 | 4/2009 | Nakamura et al. | | |
| 7,978,270 B2 | 7/2011 | Wu et al. | | |
| 2004/0227743 A1 | 11/2004 | Brown | | |
| 2006/0187177 A1 | 8/2006 | Kuo et al. | | |
| 2006/0220077 A1 | 10/2006 | Hayashi et al. | | |
| 2008/0246739 A1 * | 10/2008 | Choi et al. | ............ | 345/173 |
| 2011/0228187 A1 | 9/2011 | Wu et al. | | |
| 2011/0228205 A1 | 9/2011 | Wu et al. | | |

FOREIGN PATENT DOCUMENTS

| | | |
|---|---|---|
| EP | 1455264 | 9/2004 |
| JP | 1151500 | 10/1989 |
| JP | 2002342014 | 11/2002 |

(Continued)

OTHER PUBLICATIONS

English Abstract of JP 2008-25120, published Oct. 16, 2008, Sony Corp (1 page).

(Continued)

*Primary Examiner* — Quan-Zhen Wang
*Assistant Examiner* — Jennifer Nguyen

(57) ABSTRACT

An integrated touch panel has a display pixels arranged in a two-dimensional array of rows and columns connected to a plurality of gate lines and data lines. Each gate line receives a gate line signal for controlling the pixels in a row, and each data lines provides display data to the pixels in a column. The touch panel is connected to a sensing module having a plurality of shift registers connected in series. The touch panel has a plurality of sensor units arranged in sensor rows and sensor columns. Each sensor row receives gate line signals from a gate line, and each sensor column is connected to a sensor signal line for providing a touch signal to a shift register in the sensing module such that the shift registers connected to two adjacent sensor signal lines are separated by a different shift register is the series.

20 Claims, 13 Drawing Sheets

FOREIGN PATENT DOCUMENTS

| | | |
|---|---|---|
| JP | 2004064347 | 2/2004 |
| JP | 2004318819 | 11/2004 |
| JP | 2008065302 | 3/2008 |
| JP | 2008251020 | 10/2008 |

OTHER PUBLICATIONS

English Abstract of JP 2002-342014, published Nov. 29, 2002, NEC Microsystems Ltd (1 page).

English Abstract of JP 2008-065302, published Mar. 21, 2008, AU Optronics Corp (1 page).

English Abstract of EP 1455264, published Aug. 9, 2004, Sharp KK (1 page).

English Abstract of JP 2004-064347, published Feb. 26, 2004, Toshiba Matsushita Display Technology Co. Ltd., (1 page).

English Abstract of JP 2004-318819, published Nov. 11, 2004, Toshiba Matsushita Display Technology Co. Ltd., (1 page).

\* cited by examiner

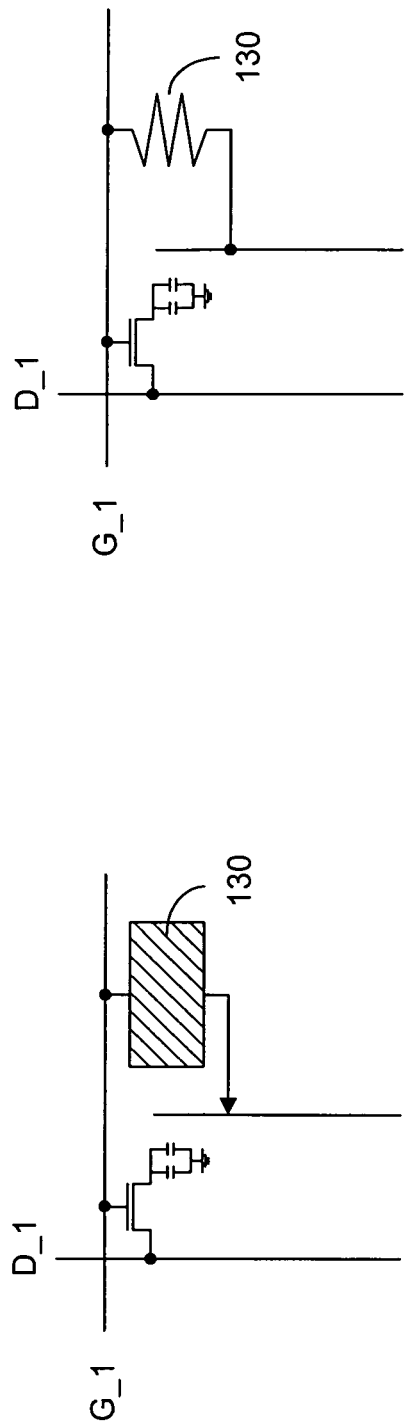
FIG. 6a
FIG. 6c
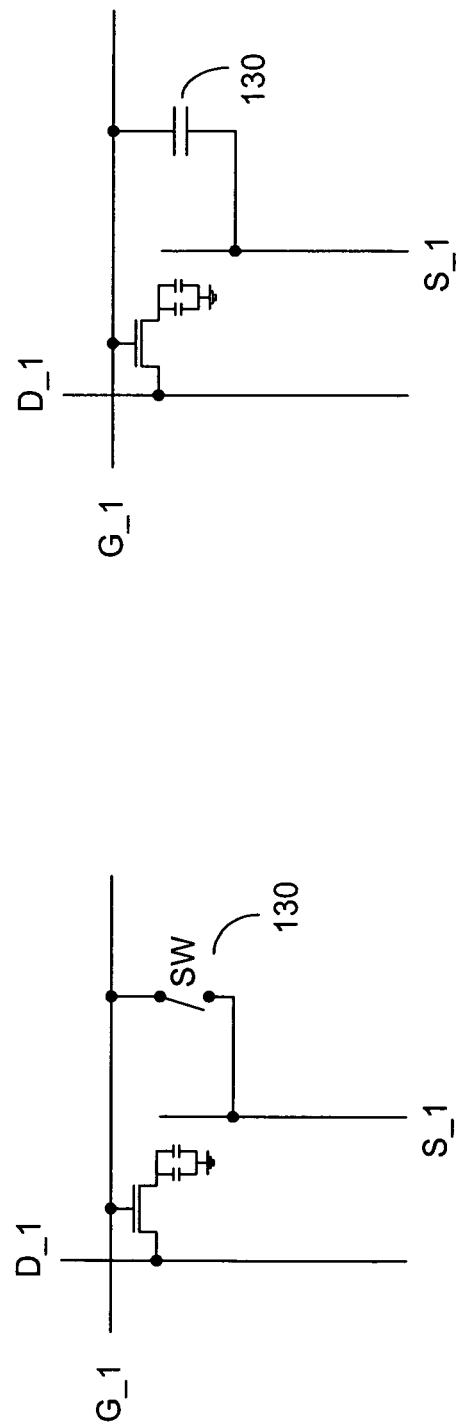
FIG. 6b
FIG. 6d

Vst: (Enable state) input from Touch event

INTEGRATED TOUCH PANEL AND METHOD FOR MAKING SAME

FIELD OF THE INVENTION

The present invention relates generally to a touch screen and, more particularly, to a touch screen integrated into a display panel.

BACKGROUND OF THE INVENTION

A touch screen is generally composed of a plurality of sensor cells arranged in an array on a screen surface or a substrate to provide positional information to a processor. The touch screen can be integrated into a display panel which shows the function or some information associated with a sensor cell at the position to be touched. The display panel can be a liquid crystal display panel, a light-emitting diode (such as OLED) panel, and the like.

SUMMARY OF THE INVENTION

The present invention provides a touch panel integrated into a display panel having a plurality of pixels arranged in a two-dimensional array of rows and columns. The display panel has a plurality of gate lines and data lines. Each of the gate lines receives a gate line signal for controlling the pixels in a pixel row, and each of the data lines provides display data to the pixels in a pixel column. The touch panel is connected to one or more touch sensing modules, each module having a plurality of shift registers connected in series. The touch panel has a plurality of sensor units arranged in a sensor array such that the sensor units in each sensor row is arranged to receive gate line signals from a gate line, and the sensor units in each sensor column are connected to a sensor signal line to provide a touch signal to a shift register in the touch sensing module such that the shift registers connected to two adjacent sensor signal lines are separated by a different shift register is the series.

Thus, the first aspect of the present invention is a touch panel, which comprises:

a plurality of display pixels;

a plurality of first signal lines for controlling the display pixels, the display pixels arranged in a pixel array; and a plurality of sensor units arranged in a sensor array, wherein the sensor units are associated with a plurality of second signal lines and a sensing mode, the sensing module comprising a plurality of shift registers connected in series, each sensor unit configured for conveying a sense signal associated with one of said first signal lines to the sensing module through one of said second signal lines, wherein each second signal line is connected to one of said shift registers such that the shift registers connected to two adjacent second signal lines are separated by at least another one of the shift registers in the series.

According to one embodiment of the present invention, only one sensing module is connected to the second signal lines to sense the touch event and to locate the touch event on the touch panel.

According to another embodiment of the present invention, two sensing modules are connected to different second signal lines to sense the touch event and to locate the touch event on the touch panel.

According to various embodiments of the present invention, the display pixels are arranged in a pixel arrays in rows and columns, wherein the first signal lines comprise a plurality of gate lines and each row of pixels is controlled by gate line signals in a gate line.

According to various embodiments of the present invention, the sensor units are arranged in a sensor array having a plurality of sensor rows and sensor columns. The sensor units in each of the sensor row are arranged to receive the gate line signals in one of the gate lines, and the sensor units in each of the sensor columns is connect to a second signal line.

The second aspect of the present invention is a method for touch sensing. The method comprises:

connecting a plurality of shift registers in a series, each shift register arranged to receive a clock signal; and coupling a plurality of sensor units to the shift registers through a plurality of signal lines, wherein each of the signal lines is connected to one of the shift registers such that the shift registers connected to two adjacent signal lines are separated by at least another one of the shift registers, wherein each sensor unit is arranged to provide a first signal indicative of a touch event through one of the signal lines, and wherein each of the shift registers comprises a latching unit operable in a first state and a second state, such that a shift register is configured to output a second signal to a subsequent shift register in the series in response to the clock signal only when the latching unit in said shift register is operated in the second state, and wherein the latching unit is operable in the second state only when said corresponding shift register receives at least one of the first signal from one of the signal lines and the second signal from a preceding shift register in the series.

applying a series of the clock signals to each of the shift registers, wherein each shift register comprises an output end for outputting the second signal;

obtaining an output signal from the output end of one of last shift registers in the series in response to said clock signals; and determining the touch event from the output signal.

When the sensor units are configured to receive control signals from a plurality of control lines, and the sensor units are arranged in an array comprising a plurality of columns and a plurality of rows, such that each row of the sensor units in the array is arranged to receive the control signals from a different one of the control lines, and wherein the first signal indicative of the touch event is provided only in response to a control signal, the method further comprises:

sequentially providing the control signal to each of the control lines so as to determine the touch event associated with each row of the sensor units in a sequential manner.

The third aspect of the present invention is a method for touch sensing. The method comprises arranging on a panel a plurality of display pixels and a plurality of first signal lines to convey control signals for controlling the display pixels; providing a plurality of sensor units on the panel, the sensor units configured to receive the control signals from the first signal lines; and arranging on the panel a plurality of second signal lines, the second signal lines electrically connected to a sensor module, the sensing module comprises a plurality of shift registers connected in series, wherein each of the sensor units is configured to provide a sense signal to the sensing module via one of the second signal lines, and wherein each for the second signal lines is connected to one of the shift registers such that the shift registers connected to two adjacent second signal lines are separated by at least another one of the shift registers.

The sense signal is provided in response to a control signal in a touch event associated with said each of the sensor units. The display pixels are arranged in a plurality of pixel rows and the display pixels in a pixel row are arranged to receive a control signal from one of the first signal lines and wherein the sense signal is caused by a touch event at a sensor unit and by the control signal in the first signal line associated with said sensor unit According to the present invention, the display pixels are arranged in a pixel array having pixel rows and pixel columns and the first signal lines comprise a plurality of gate lines to provide gate line signals, wherein the touch signal is provided in response to a gate line signal in the gate line associated with the sensor unit.

The present invention will become apparent upon reading the description taken in conjunction with FIGS. 2 to 10.

BRIEF DESCRIPTION OF THE DRAWINGS

FIGS. 6a to 6d illustrate a variety of touch sensors, according to the present invention.

DETAILED DESCRIPTION OF THE INVENTION

Figure 1:
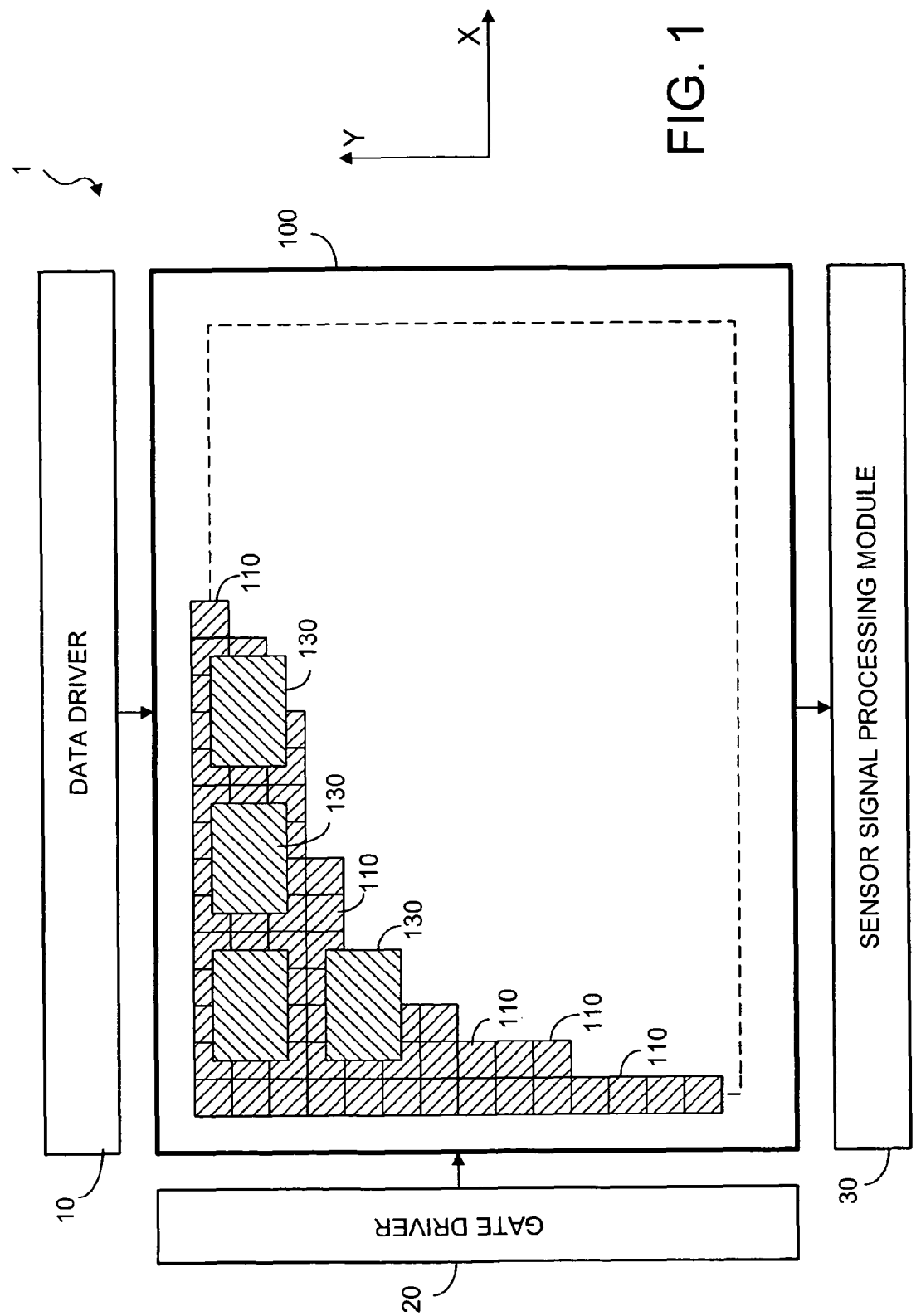
FIG. 1 shows an integrated touch panel, having a sensor signal processing module adjacent to a touch screen, according to the present invention.
Figure 2:
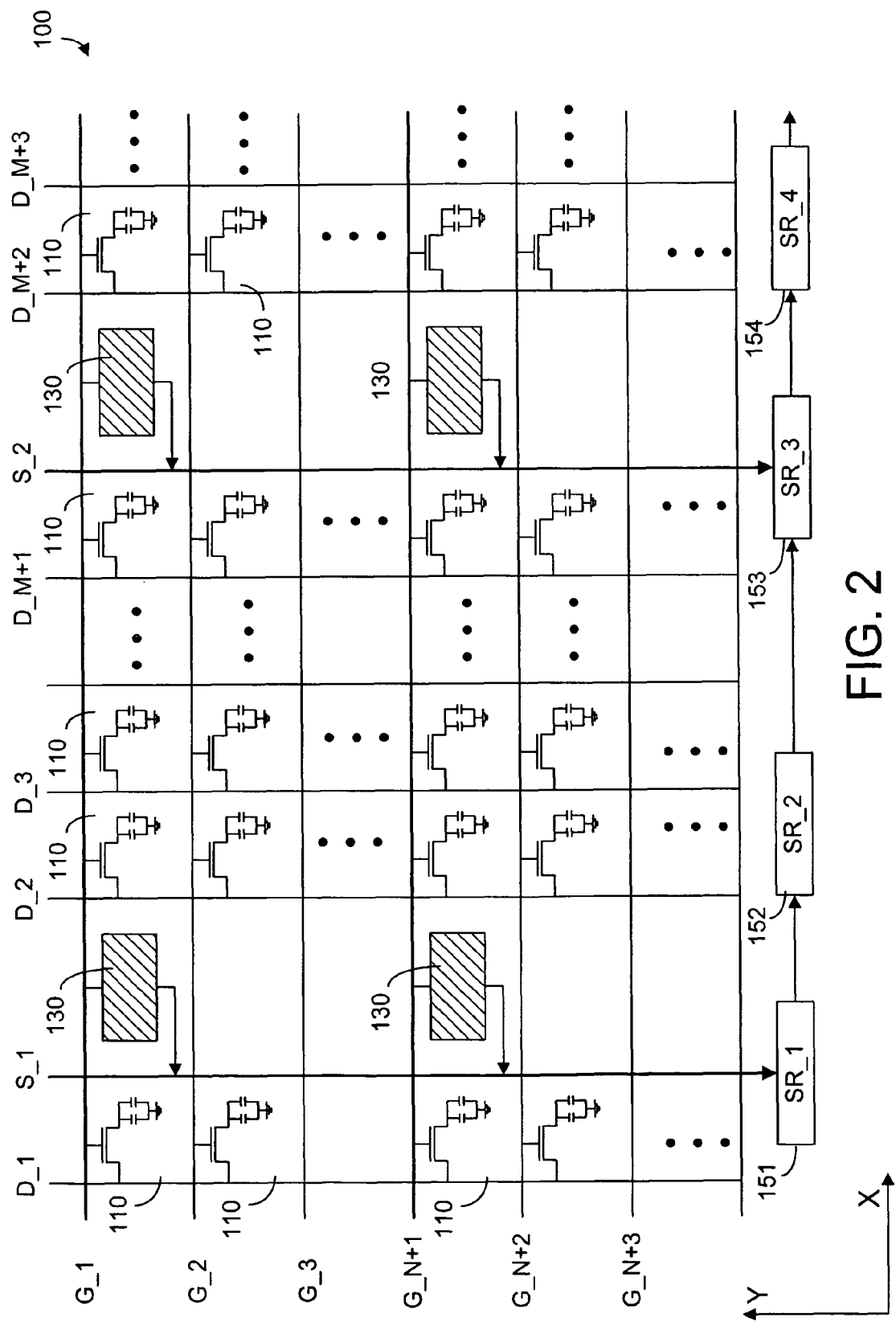
FIG. 2 shows the touch panel, according to one embodiment of the present invention.
Figure 3:
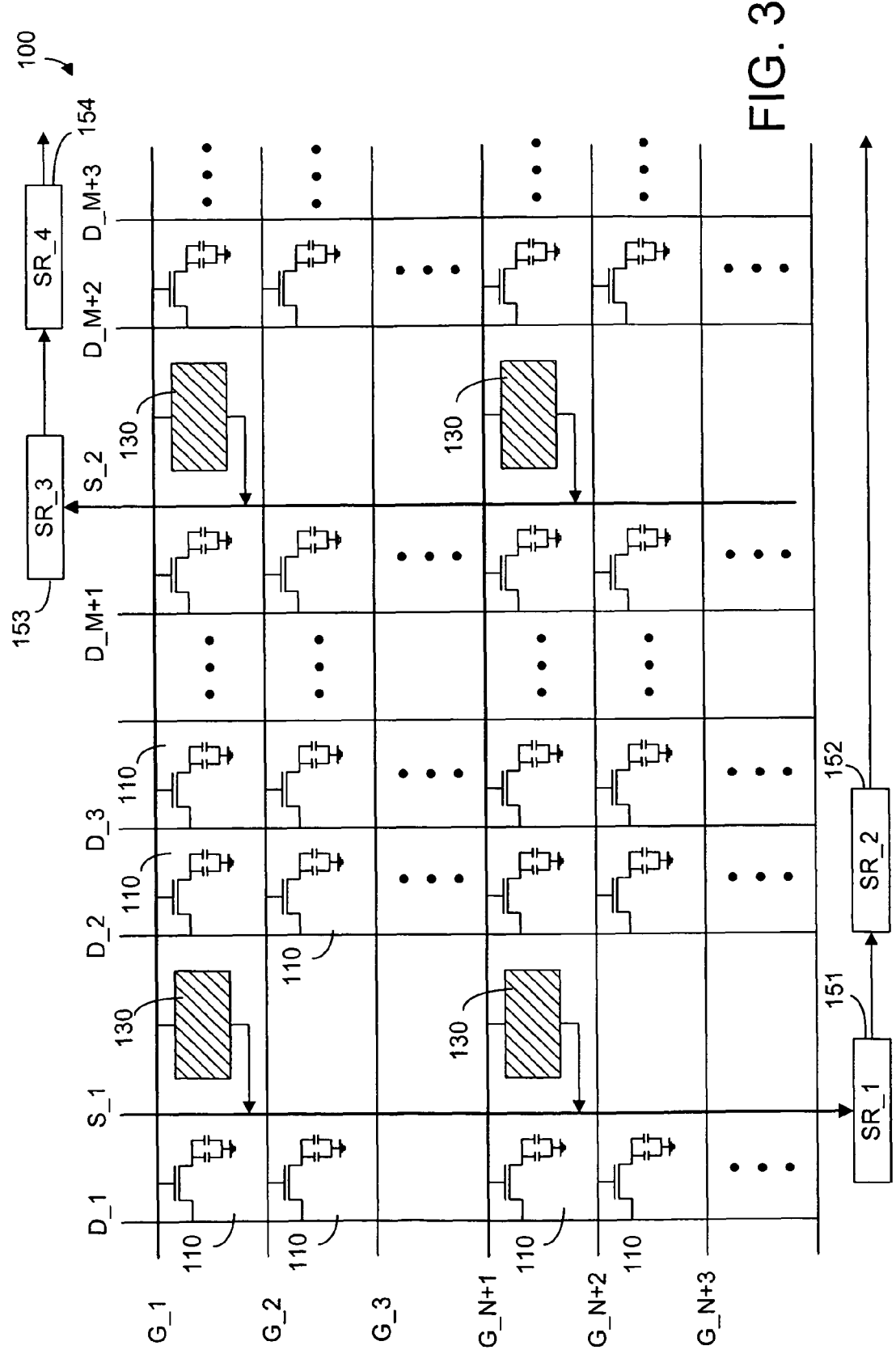
FIG. 3 shows the touch panel, according to another embodiment of the present invention.

A touch screen is generally composed of a plurality of sensor cells arranged in an array on a screen surface or a substrate to provide positional information to a processor. As shown in FIG. 1, an integrated touch panel 1 has a touch panel 100 including a plurality of display pixels 110 arranged in a two-dimensional array, along the X and Y directions. A gate driver 20 is used to control the display pixels 110. A data driver 10 is used to provide data to the pixels 110. A sensor signal processing module 30 is used to receive sense signals (touch signals) from the touch panel. As shown in FIGS. 2 and 3, a plurality of gate lines, G_1, G_2, . . . are configured for receiving gate line signals in the gate driver 20 (FIG. 1) in order to turn the pixels 110 on or off. A plurality of data lines D_1, D_2, . . . are configured for receiving data signals from the data driver 10 (FIG. 1) and conveying the data signals to the pixels 110. The pixels 110 that are turned on or off by the gate line signals in any one of the gate lines, G_1, G_2, . . . along the X direction are referred to as pixels in a row. Likewise, the pixels 110 that receive data signals from any one of the data lines D_1, D_2, . . . along the Y direction are referred to as pixels in a column. The touch panel 100 also has a plurality of sensor units 130 to allow a user to select a function or to provide an input by touching one or more sensor units 130. The signals provided to the display pixels 110 can be used to indicate the positions of the sensor units 130 and the functions associated with the positions to be touched, for example. The sensor units are also connected to some of the gate lines so that the gate line signals can also be used to provide a sense signal to a shift register when one of the sensor units is touched.

Figure 4:
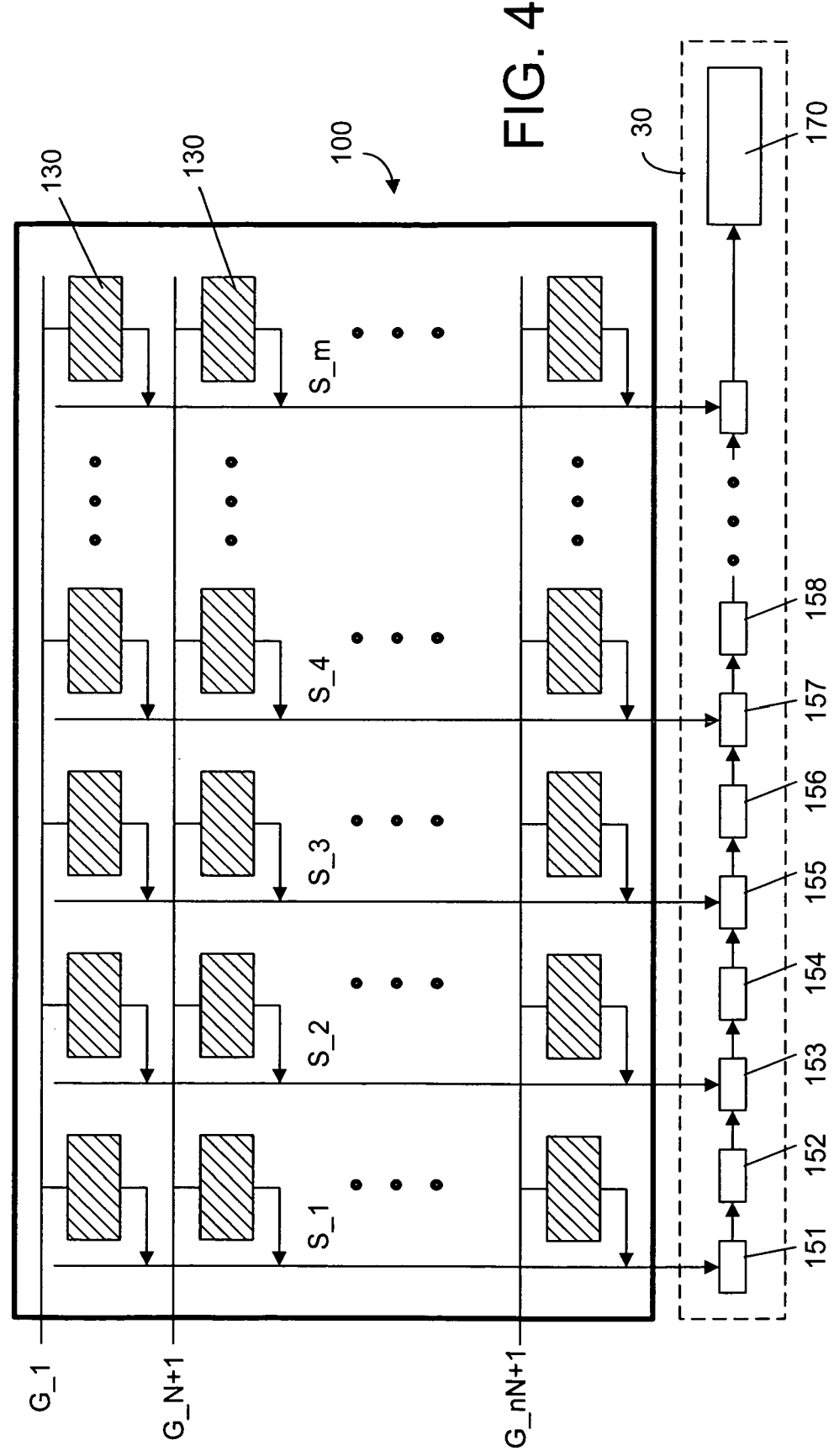
FIG. 4 shows the arrangement of shift registers associated with the touch screen, according to one embodiment of the present invention.

As shown in FIG. 2, the sensor units 130 are arranged in a two-dimensional array such that the sensor units in a column can share a signal line and the sensor units in a row can receive the gate line signal from the same gate line. As shown, a row of sensor units 130 are connected to the gate line G_, and another row of sensor units 130 are connected to the gate line G_N+1. Also, a column of sensor units 130 are connected to the signal line S_1, and another column of sensor units 130 are connected to the signal line S_2. The signal lines are connected to a plurality of shift registers connected in series. When one of the sensor units 130 connected to the signal line S_1 is touched, a sense signal is conveyed to the shift register SR_1 through the signal line S_1. When one of the sensor units 130 connected to the signal line S_2 is touched, a sense signal is conveyed to the shift register SR_3 through the signal line S_2, and so forth. Thus, the shift registers connected to two adjacent signal lines are separated by another shift register, as shown in FIGS. 2 and 4. Only the odd-numbered shift registers S_2 x−1 are configured for receiving signals from the signal line S_x, where x is a positive integer equal to or greater than 1. As shown in FIG. 4, the shift registers 151, 152, 153, 154, 155, 156, . . . are connected in series, and the last shift register in the series is connected to a sensor IC 170 in the sensor signal processing module 30. The shift registers (151, 153, 155, . . . ) connected to two adjacent signal lines (S_1, S_2, S_3, . . . , S_m) are separated by another one of shift registers (152, 154, 156, . . . ).

Figure 5:
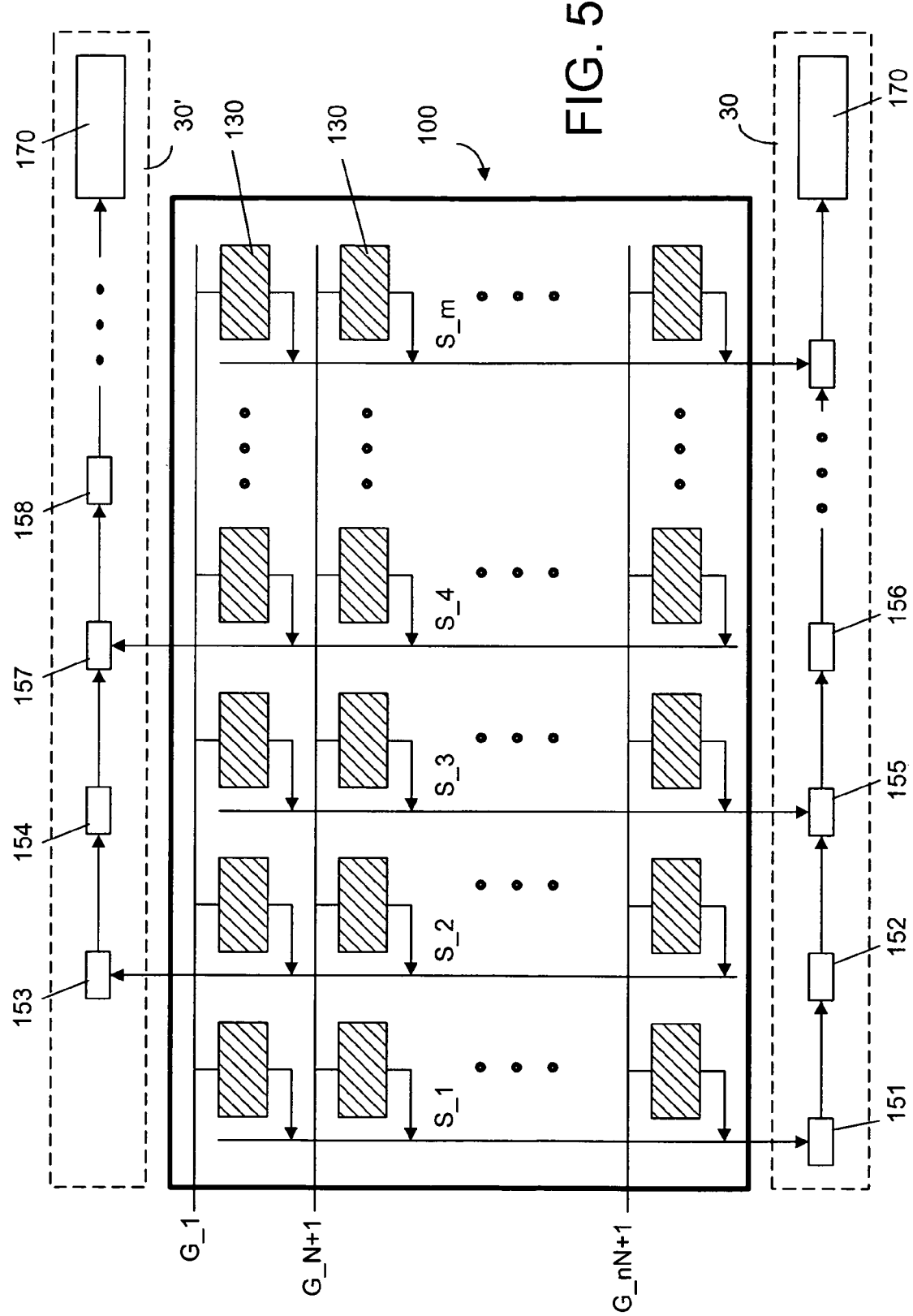
FIG. 5 shows the arrangement of shift registers associated with the touch screen, according to another embodiment of the present invention.

FIGS. 3 and 5 show the arrangement of the shift registers, according to another embodiment of the present invention. As shown in FIGS. 3 and 5, two separate sensor signal processing modules 30 and 30' are used to process the sensor signals from the touch panel 100. In this arrangement, the sense signals from the odd-numbered signal lines S_1, S_3, . . . are conveyed to the module 30 for processing, whereas the sensor signals from the even-numbered signal lines S_2, S_4, . . . are conveyed to the module 30' for processing. The shift registers 151, 152, 155, 156, . . . are located in the module 30, whereas the shift registers 153, 154, 157, . . . are located in the module 30'. In the module 30, each adjacent pair of the sense-signal receiving shift registers 151, 155, . . . is separated by another shift register 152, 156, . . . . Likewise, In the module 30', each adjacent pair of the sense-signal receiving shift registers 153, 157, . . . is separated by another shift register 154, 158, . . . , for example.

It should be noted that the sensor units 130 can be one of many different forms. For example, the gate line G_1, G_2, . . . can be fabricated on one substrate and the signal lines S_1, S_2, S_3, . . . can be fabricated on another substrate and the two substrates are separated by a gap. One of the signal lines can be caused to make electrical contact, directly or indirectly, with one of the gate lines by closing the gap between the two substrates at a sensor unit. Thus, a sensor unit 130 in FIG. 6a is equivalent to a mechanical switch, SW, as shown in FIG. 6b. When the switch SW is closed due to a touch event, the switch allows a gate line signal from the gate line G_1 to reach the shift register SR_1 via the signal line S_1 as a sense or touch signal (see FIG. 3). In another embodiment of the present invention, a gate line and a signal line can be designed to have a certain capacitance, as shown in FIG. 6d. When the sensor unit is touched, the capacitance can be caused to change so that a touch at that sensor unit can be sensed. When both the gate lines and the signal lines are fabricated on a single substrate, for example, the sensor unit 130 can be a resistor pad, as shown in FIG. 6c. The resistor pad can have a predetermined resistance range and a touch can cause the reduction of the resistance for touch sensing purposes.

Figure 7:
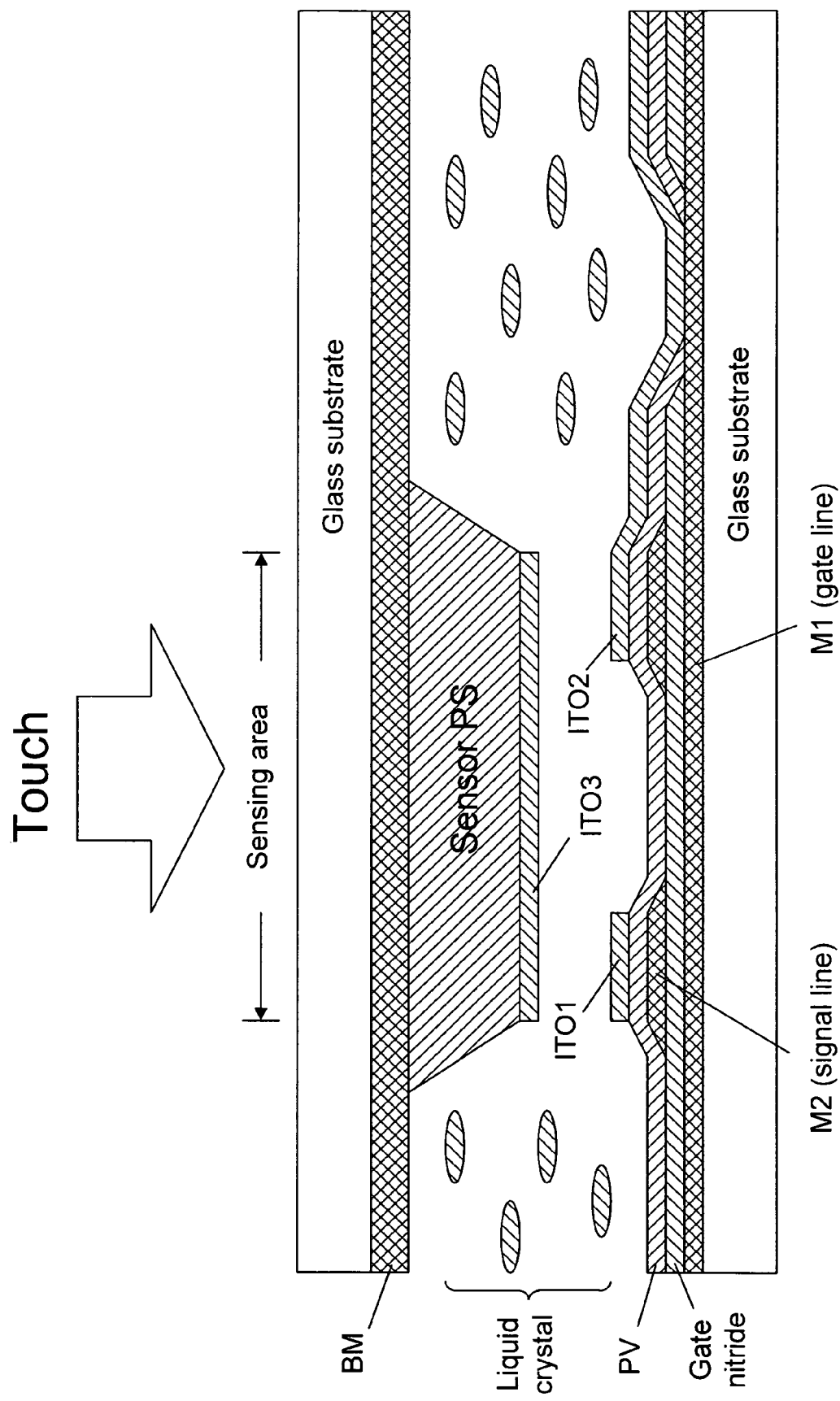
FIG. 7 shows an exemplary touch sensor built between two substrates of a liquid crystal display panel, according to one embodiment of the present invention.

FIG. 7 shows an exemplary touch sensor built between two substrates of a liquid crystal display panel, according to one embodiment of the present invention. The touch sensor 130 is fabricated as a contact switch for providing electrical contact between two ITO (Indium tin oxide) patches. As shown in FIG. 7, the liquid crystal display panel has an upper substrate and a lower substrate and a layer of liquid crystal material between the substrates. On the upper substrate, a dielectric layer (sensor PS, or photo-spacer) and an electrically conductive layer ITO3 are fabricated on a BM layer (black material, usually used in a color filter) as part of a sensor bridge. The photo-spacer can be made of a photo-resist material, for example. On the lower substrate, a gate line M1 is provided for selecting a pixel row of the liquid crystal display panel. Part of the gate line is covered by a dielectric layer, such as nitride, and an electrically conductive patch ITO2 is made contact with the gate line M1. The nitride layer is used to electrically separate the gate line and shift register signal lines. One of the signal lines is shown as an electrically conductive line M2. On top of the signal line M2, an electrically conductive patch ITO1 is provided as one of the touch contact points. In a touch event, the upper substrate is pushed downward such that the ITO1 patch is electrically connected to the ITO2 patch through the ITO3 patch.

In this cross sectional view, the signal line M2 and the ITO1 patch is separated by a PV layer, which is a dielectric layer. It should be noted, however, that the signal line M2 and the ITO1 patches are electrically connected in a nearby area of the liquid crystal display panel. Thus, when the touch sensor is not activated, the two electrically conductive patches ITO1 and ITO2 are electrically isolated, and the signal line M2 and the gate line M1 are also electrically isolated. When the sensing area is pushed downward in a touch event, the two electrically conductive patches ITO1 and ITO2 are electrically connected by the ITO3 patch, and a signal on the gate line M1 can be read out from the signal line M2. For example, the gate line can be G_1 and the signal line can be S_1 as show in FIG. 6b.

Figure 8A:
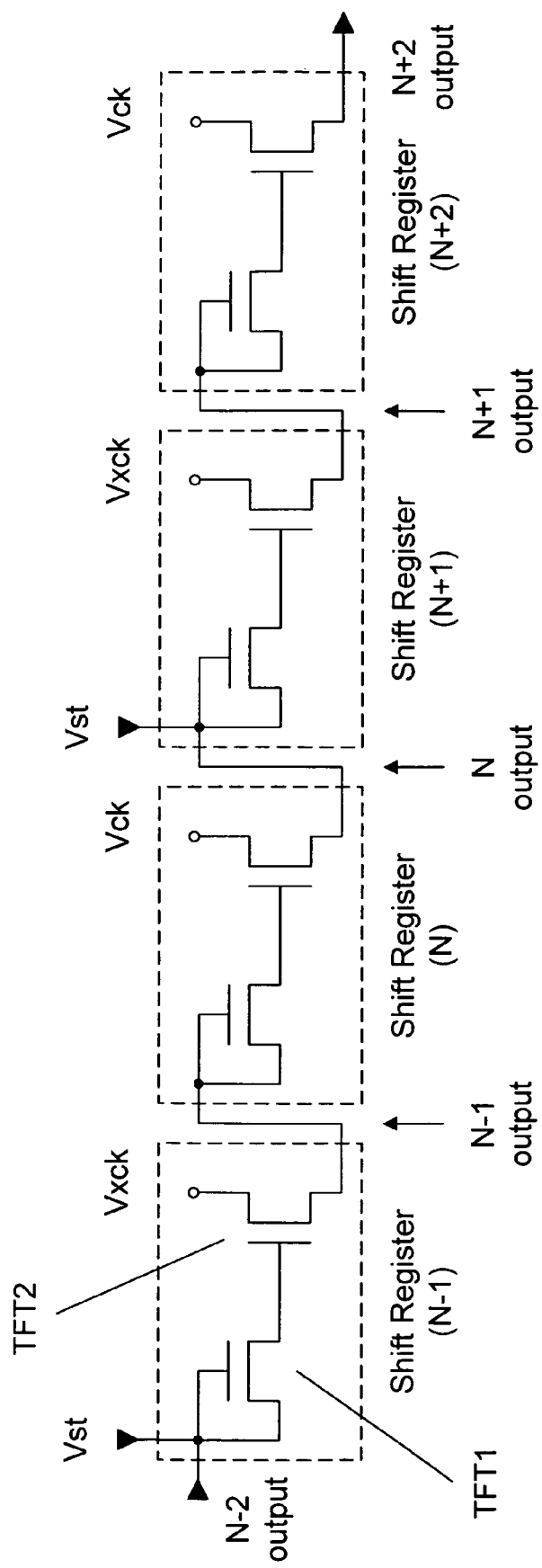
FIG. 8a shows an exemplary arrangement of a series of shift registers, according to one embodiment of the present invention.

FIG. 8a shows an exemplary arrangement of a series of shift registers, according to one embodiment of the present invention. In the shift-register series as shown in FIG. 8a, each shift register has a first switching element (TFT1) connected to a second switching element (TFT2), each of which can be a TFT or thin-film transistor, for example. The first switching element in shift registers N−1, N, N+1, . . . is used as a latch for latching a touch signal Vst (which provides an enable-state input when a touch event occurs) by the output signal from the preceding shift register. The output from the first switching element in shift registers N−1, N+1, . . . provides an enable signal to the second switching element. The second switching element is arranged to receive signal pulses either from Vck or Vxck which are complementary in phase (see FIG. 8b). The output of each register is either a pulse from Vck and Vxck if the second switching element is enabled by the first switching element. The first switching element becomes conducting either by a touch signal Vst or the output signal from the preceding shift register. The second switching element becomes conducting when the first switching element is in the conducting state. For example, if the shift register N−1 receives a touch signal Vst, it provides an output pulse at the N−1 output to the shift register N in synchronism to a clock pulse Vxck. At the next clock pulse Vck, the shift registers N provides an output pulse at the N output to the shift register (N+1) and so on, until the end of one x-direction cycle.

Figure 8B:
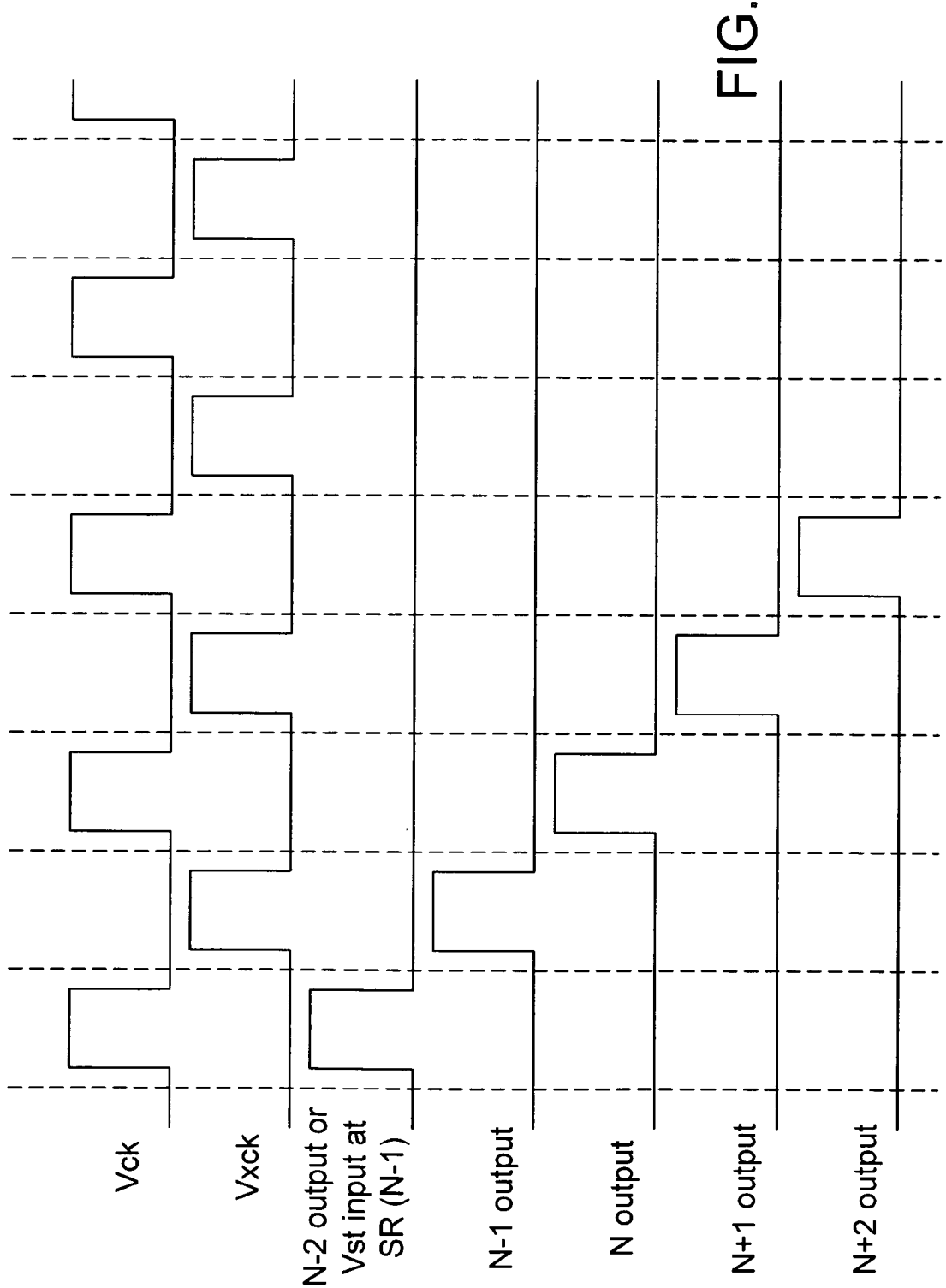
FIG. 8b is a timing chart showing the relationship between the output from each of the shift registers and the clock signals.

The output signals from those shift registers in one x-direction cycle are a series of pulses as shown in FIG. 8b, assuming the touch signal Vst is only received by the shift register (N−1), and the N−1 output enables the next shift register N. The signal received at the end of one X-direction cycle is as follows:

$$\begin{array}{ccccc} \ldots & 0 & 0 & 1 & 0 & \ldots \\ \ldots & N+1 & N & N-1 & N-2 & \ldots \end{array}$$

Figure 9A:
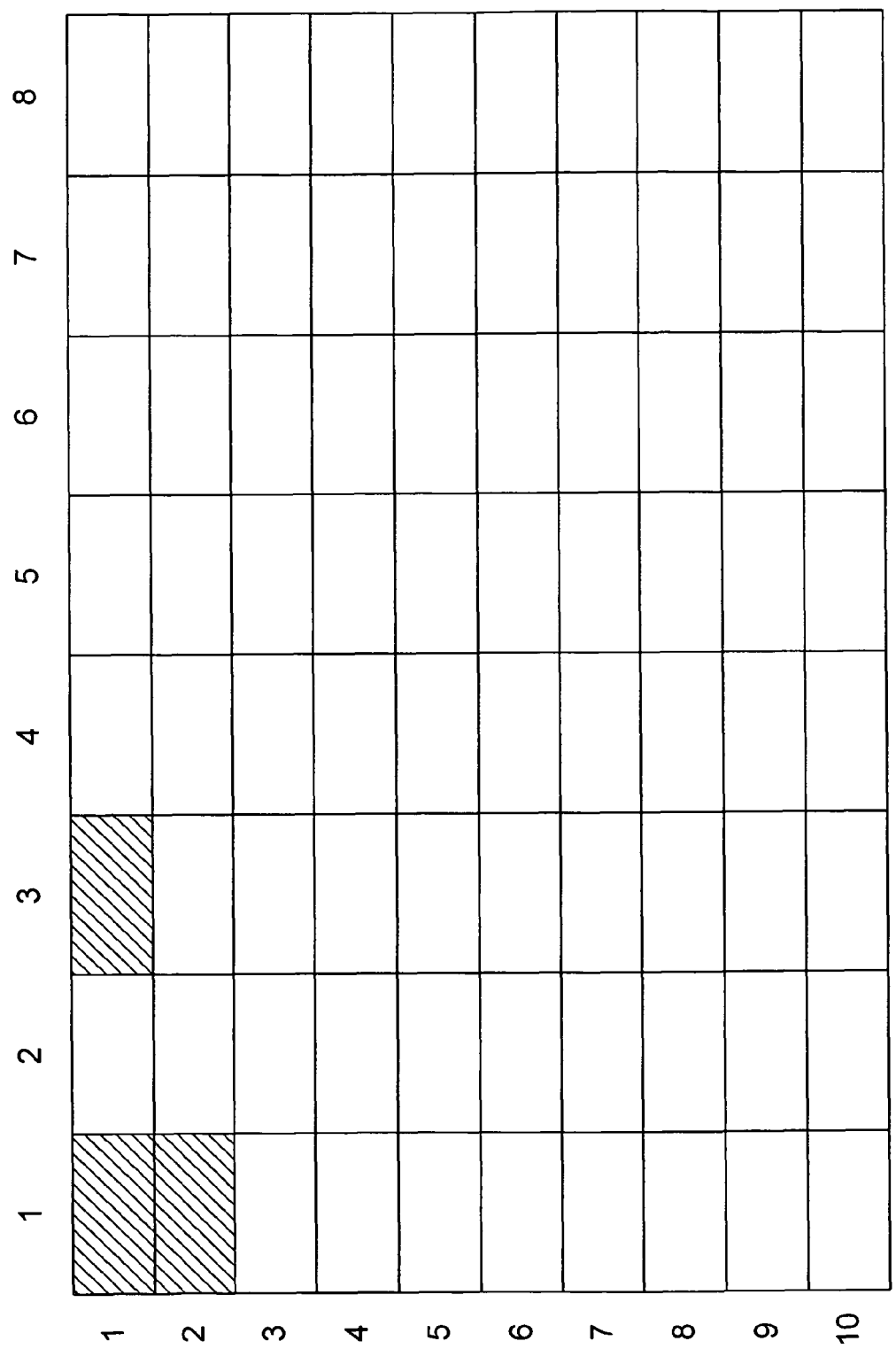
FIGS. 9a to 9c show an operation example of the touch screen, according to one embodiment of the present invention.
Figure 9B:
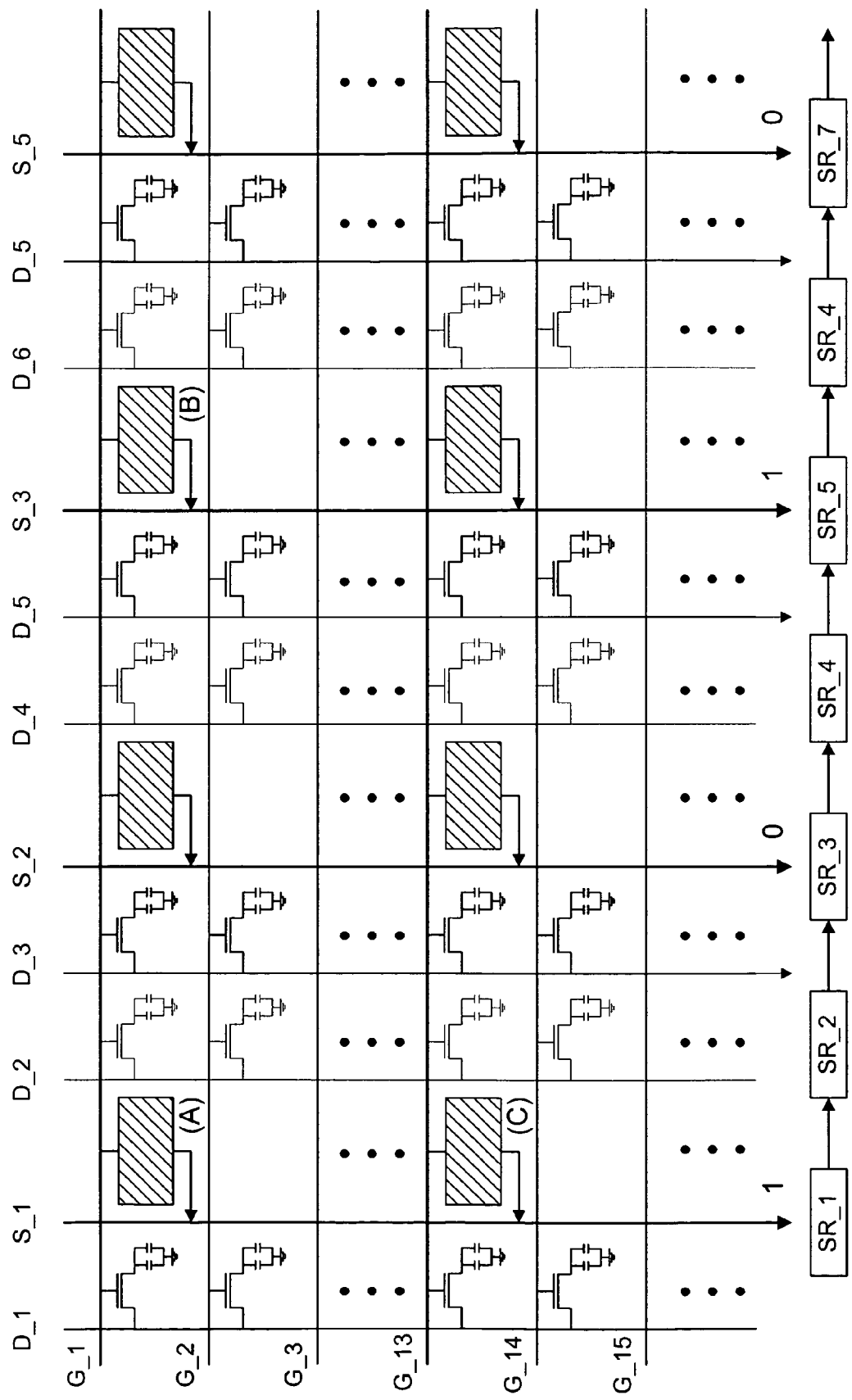
Figure 9C:
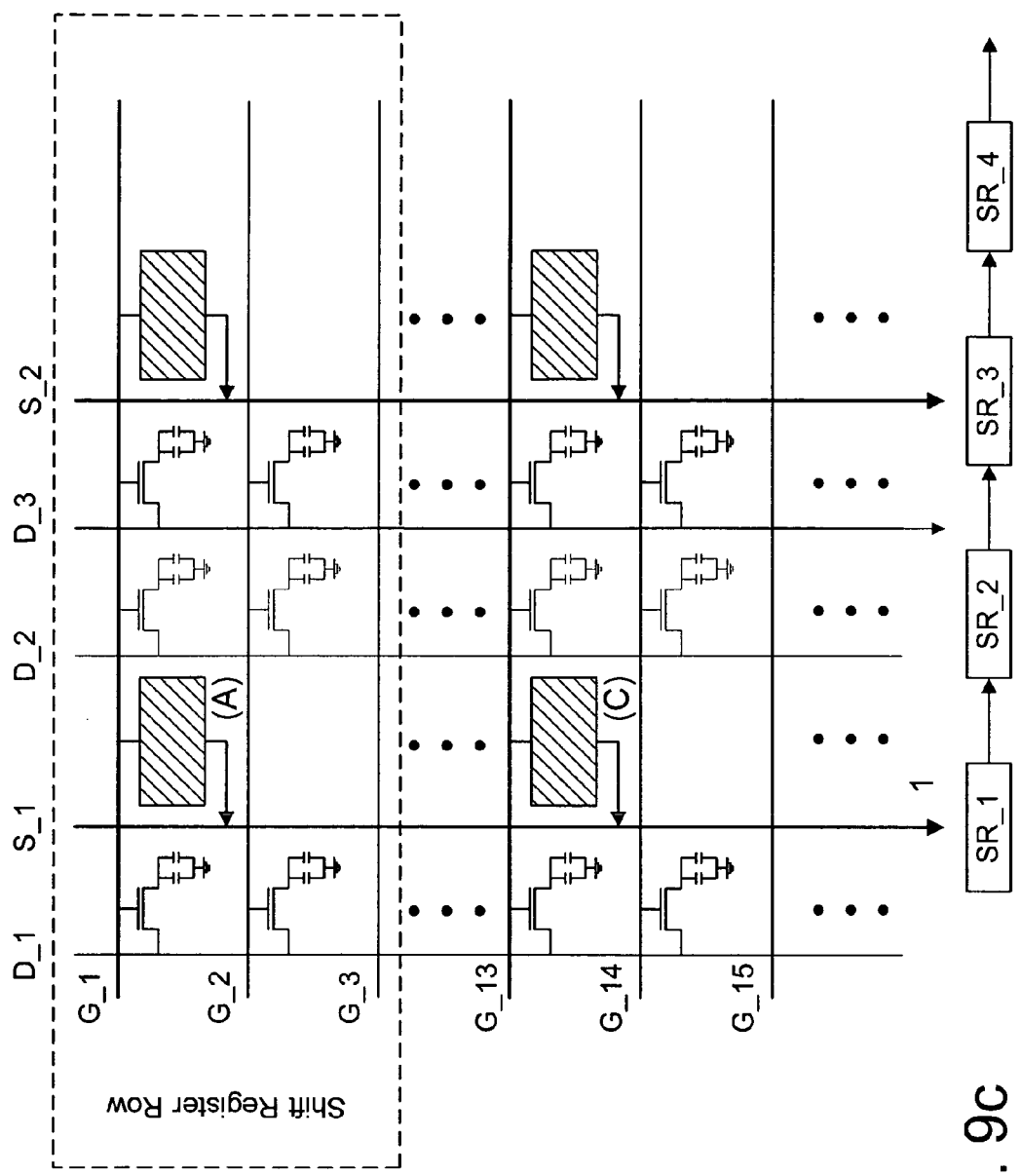

FIGS. 9a to 9c show an example of the touch screen, according to one embodiment of the present invention. In the example as shown in FIGS. 9a to 9c, the touch screen has 10 rows by 8 columns of touch sensor elements and the display panel has 100 rows of pixels. Assuming that, in a touch event, the sensor cells marked as positions (A), (B) and (C) are simultaneously touched, as shown in FIG. 9b, the shift-registering reading is as follows:
Within 1 frame scan time:
The $1^{st}$ output data as gate-line signals scanned from G_1 to G_10=>(00000101)
. . . .
The $2^{nd}$ output data as gate-line signals scanned from G 11 to G_20=>(00000001)
The $3^{rd}$ output data as gate-line signals scanned from G_21 to G_30=>(00000000)
The $10^{th}$ output data as gate-line signals scanned from G_91 to G-100=>(00000000)
Here "1" indicates an enable state for a shift register. The scanning pulses G_1, G_2, . . . , G_12 are shown in FIG. 9c.

From the $1^{st}$ output data (00000101), the column positions of the touched sensors can be determined. From the $1^{st}$ and $2^{nd}$ data (00000101) and ( 00000001), the row positions of the touched sensors can be determined. From the column positions and row positions, the touched sensor positions can be determined as (x, y)=(1, 1), (3, 1) and (1, 2).

In the example as shown in FIGS. 9a-9c, the total number of rows of touch sensors is n=10 and the total number of columns of touch sensors is m=8. With a display having 100 rows of pixels, each row of touch sensors cover n=10 rows of pixels. With n≧m, the output data can be obtained as follows:

As gate-line signals are sequentially scanned from gate line G_1 to G_n, the signal from the touch event is also sequentially registered from SR_1 to SR_m. From the output data from SR_1 to SR_m as read in the sensor IC (see FIGS. 4 and 5), it is possible to determine the row positions of the touch event.

As gate-line signals are sequentially scanned from gate line G_n+1 to G_2n, the signal from the touch event is also sequentially registered from SR_1 to SR_m. From the output data reading from SR_1 to SR_m as read in the sensor IC, it is possible to determine the column positions of the touch event.

With the row positions and the column positions, it is possible to determine the touched location.

It should be understood that the data from the signal lines S_1, S_2, . . . to the corresponding shift register SR_1, SR_3, . . . (see FIGS. 2 and 3) is provided in a parallel manner, whereas the data from the shift registers to the sensor IC is provided in a series manner.

The touch sensing method as illustrated in FIGS. 8a-9b can also be summarized in the following steps:

connecting a plurality of shift registers in a series, each shift register arranged to receive a clock signal; and coupling a plurality of sensor units to the shift registers through a plurality of signal lines, wherein each of the signal lines is connected to one of the shift registers such that the shift registers connected to two adjacent signal lines are separated by at least another one of the shift registers, wherein each sensor unit is arranged to provide a first signal indicative of a touch event through one of the signal lines, and wherein each of the shift registers comprises a latching unit operable in a first state and a second state, such that a shift register is configured to output a second signal to a subsequent shift register in the series in response to the clock signal only when the latching unit in said shift register is operated in the second state, and wherein the latching unit is operable in the second state only when said corresponding shift register receives at least one of the first signal from one of the signal lines and the second signal from a preceding shift register in the series.

applying a series of the clock signals to each of the shift registers, wherein each shift register comprises an output end for outputting the second signal;

obtaining an output signal from the output end of one of last shift registers in the series in response to said clock signals; and determining the touch event from the output signal.

When the sensor units are arranged on a panel in an array defining a plurality of coordinates; and the first state and the second state of the latching unit in a string of shift registers in the series are configured to provide touch data indicative of a coordinate of the touch event, and wherein the series has a series end, the touch sensing method further comprises:

providing a plurality of the clock signals to each of the shift registers for shifting the touch data toward the series end; and obtaining the touch data from the series end for determining the coordinate of the touch event.

When the sensor units are configured to receive control signals from a plurality of control lines, and arranged in an array comprising a plurality of columns and a plurality of rows, such that each row of the sensor units in the array is arranged to receive the control signals from a different one of the control lines, and wherein the first signal indicative of the touch event is provided only in response to a control signal, the touch sensing method further comprises:

sequentially providing the control signal to each of the control lines so as to determine the touch event associated with each row of the sensor units in a sequential manner.

According to various embodiments of the present invention, the sensor units are arranged on a display panel comprising a plurality of display pixels comprising in a plurality of pixel rows and the display pixels in a pixel row are controlled by the control signals from one of the control lines.

Figure 10:
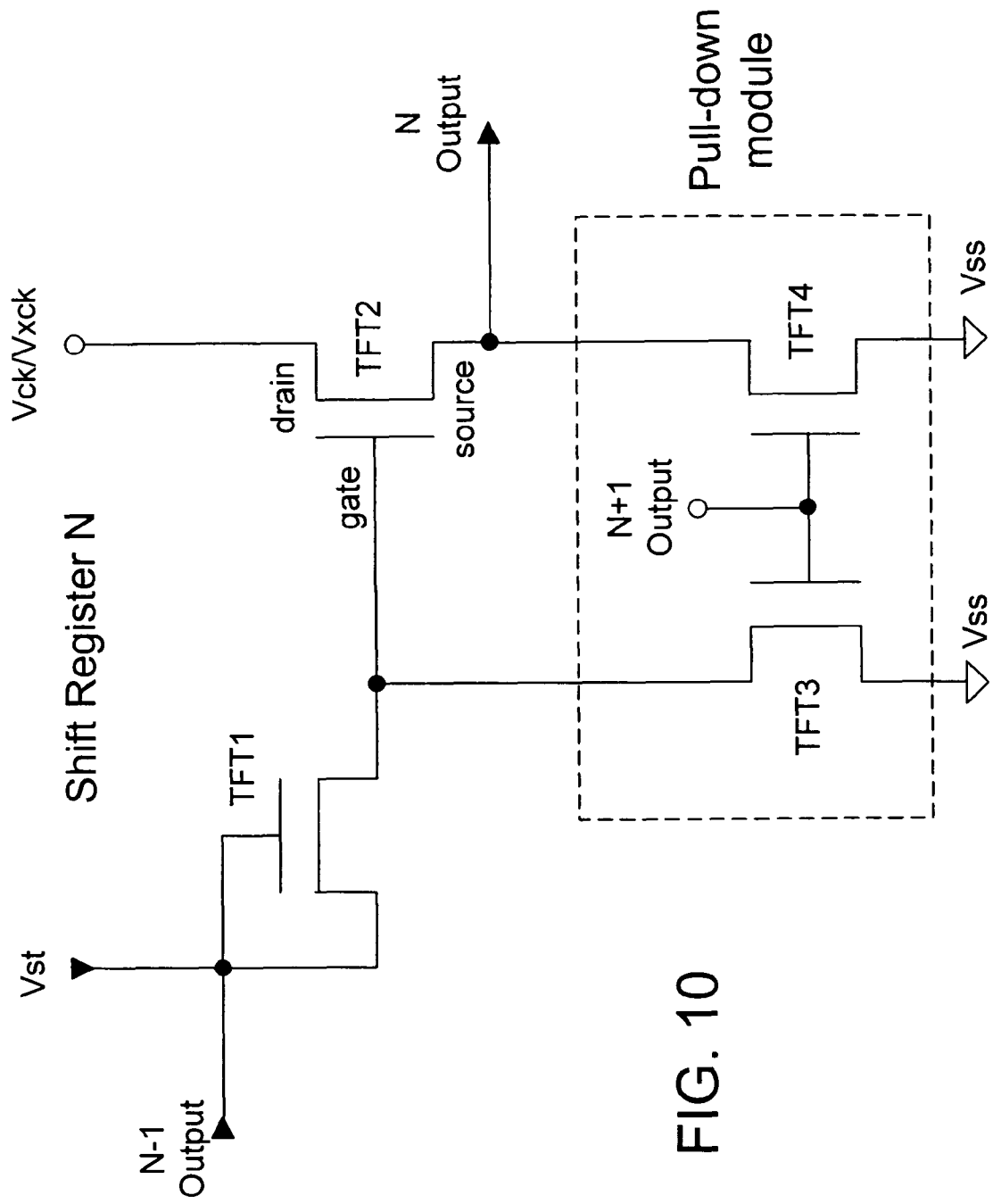
FIG. 10 shows an example of the shift registers for use in the touch panel system, according to various embodiments of the present invention.

FIG. 10 shows an example of the shift registers for use in the touch panel system, according to various embodiments of the present invention. As shown in FIG. 10, the shift register N is connected to a pull-down module. As such, as soon as the shift register in the next stage provides its output pulse (N+1 Output), the gate terminal and the source terminal of the second switching element (TFT2) of the current-stage shift register are pulled down by TFT3 and TFT4 to a negative voltage, for example. Any residual voltage level at the output of TFT1 and the output of TFT2 can be removed so as to prevent an erroneous output from the shift register N.

As can be seen in FIG. 7, the electrically conductive patches ITO1, ITO2, and the signal line (M2), are fabricated in the proximity of the gate line (M1) on the same substrate. Each of the signal lines is connected to a shift register (see FIGS. 2 and 3) and the signals from the shift registers are serially provided to one or two sensor ICs 170 (FIGS. 4 and 5). The shift registers and the sensor ICs can be fabricated in the same amorphous silicon circuit adjacent to the liquid crystal display panel (see FIG. 1). As such, the fabricating cost can be reduced.

It should be noted that FIG. 8a is only used to show how a touch signal in a pixel column is sensed using a series of interconnecting shift registers. In the embodiment as shown in FIG. 2, only the shift registers SR_1, SR_3, SR_5, . . . are arranged to receive the touch signal. This means that the gate terminal of TFT1 in SR_2, SR_4, . . . is only arranged to receive the output pulse from the preceding state. Likewise, in the embodiment as shown in FIGS. 3 and 5, only every other shift register in each shift register series is arranged to receive the touch signal. As shown in FIGS. 3 and 5, only the shifter registers 151, 155, 159 (not shown), 163 (not shown) in the module 30 are arranged to receive the touch signal, and only the shift registers 153, 157, 161 (not shown), 165 (not shown) in the module 30' are arranged to receive the touch signal. Thus, in a shift register series in a sensing or sensor signal processing module, according to various embodiments of the present invention, at least one "dummy" shift register is provided between two shift registers that are arranged to receive a touch signal. While the dummy shift register is able to provide an output signal to the next stage in response to the output signal from the preceding stage, it is not arranged to receive a touch signal. In other words, in a touch panel having a plurality of signal lines for conveying touch signals to a shift register series, the shift registers connected to two adjacent signal lines are separated by at least one other shift register in the shift register series.

In sum, in a touch panel, according to various embodiment of the present invention, the touch panel includes a plurality of display pixels (110);

a plurality of first signal lines (G_m) for controlling the display pixels, the display pixels arranged in a pixel array; and a plurality of sensor units (130) arranged in a sensor array, wherein the sensor units are associated with a plurality of second signal lines (S_x) and a sensing module (30), the sensing module comprising a plurality of shift registers (SR₁₃ 1, SR_2, SR_3, . . . ) connected in series, such that each sensor unit (130) is configured for conveying a sense signal associated with one of said first signal lines (G_m) to the sense signal line (in module 30) through one of said second signal lines (S_x), wherein each second signal line is connected to one of said shift registers such that the shift registers (SR_k, SR_k+2) connected to two adjacent second signal lines (S_x, S_x+1) are separated by at least another one of said shift registers (SR_k+1).

It should be noted that in the touch panel as shown in FIG. 4, one series of shift registers is placed on one side of the touch panel to sense the touch event. In the touch panel as shown in FIG. 5, one series of shifter registers is placed on each side of the touch panel to sensor the touch event. It is possible to place more than one shift registers series on each side of the touch panel. It is also possible to place the shift register and the sensor IC differently.

Furthermore, the display panel as depict in FIG. 7 is a liquid-crystal display panel having a first substrate and a second substrate. The second substrate is separated from the first substrate, defining a gap therebetween. As shown, the first signal lines and the second signal lines are provided to the first substrate, the first signal lines electrically isolated from the second signal lines. Each sensor unit comprises an electrically conductive segment provided on the first substrate, such that the electrically conductive segment causes one of the first signal lines to make electrical contact with one of the second signal lines for providing the sense signal in response to a control signal from said one first signal line in a touch event.

It should be note that the touch panel can be a standalone touching device or integrated into a display panel. Furthermore, the same invention can be provided on another type of display panel, such as an organic light-emitting display (OLED) panel, a polymeric light-emitting display (PLED) panel and the like. Each of the sensor units can be a contact switch similar to FIG. 7, or a resistive sensor as shown in FIG. 6c, or a capacitive sensor as shown in FIG. 6d.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A panel, comprising:
a plurality of first signal lines to convey control signals;
a sensing module comprising a plurality of shift registers connected in series;
a plurality of second signal lines electrically connected to the sensing module; and
a plurality of sensor units arranged to receive the control signals from the first signal lines, wherein each of the sensor units is configured to provide a sense signal indicative of a touch event to the sensing module via one of the second signal lines, and wherein each for the second signal lines is connected to one of the shift registers such that the shift registers connected to two adjacent second signal lines are separated by at least another one of the shift registers, and wherein the sensor units are arranged in a two-dimensional array, with each of the second signal lines connected to two or more of the sensor units, and only one or some of the shift registers connected to the second signal lines are configured to receive the sense signal at a given time so that position of each of said one or some shift registers in the sensing module can be used to identify one or more touch locations on the array.

2. The panel according to claim 1, further comprising:
a plurality of display pixels controlled by the control signals from the first signal lines.

3. The panel according to claim 2, wherein the display pixels are arranged in a plurality of pixel rows and the display pixels in a pixel row are arranged to receive a control signal from one of the first signal lines and wherein the sense signal is caused by the touch event at a sensor unit and by the control signal in the first signal line associated with said sensor unit, and wherein the sensor units comprise a row of sensors arranged to receive the control signal from one of the first signal lines.

4. The panel according to claim 3, wherein the sensor units comprise a column of sensors, each sensor is arranged to receive the control signal from a different one of the first signal lines, and the column of sensors is arranged to convey the touch signal caused by the touch event through one of the second signal lines.

5. The panel according to claim 2, wherein the panel comprises a display area and the plurality of display pixels are arranged on the display area, and wherein the sensor units are also arranged on the display area.

6. The panel according to claim 2, further comprising
a first substrate; and
a second substrate separated from the first substrate, defining a gap therebetween, wherein the first signal lines and the second signal lines are provided to the first substrate, the first signal lines electrically isolated from the second signal lines, and wherein each sensor unit comprises an electrically conductive segment provided on the first substrate, such that the electrically conductive segment causes one of the first signal lines to make electrical contact with one of the second signal lines for providing the sense signal in response to a control signal from said one first signal line in a touch event.

7. The panel according to claim 6, wherein the display pixels comprise liquid crystal display pixels.

8. The panel according to claim 1, wherein the sense signal is provided in response to a control signal during the touch event associated with said each of the sensor units.

9. The panel according to claim 1, further comprising
a further sensing module comprising a plurality of further shift registers connected in series;
a plurality of further second signal lines electrically connected to the further sensing module; and
a plurality of further sensor units arranged to receive the control signals from the first signal lines, wherein each of the further sensor units is configured to provide a sense signal to the further sensing module via one of the further second signal lines, and wherein each for the further second signal lines is connected to one of the further shift registers such that the further shift registers connected to two adjacent further second signal lines are separated by at least another one of the further shift registers, wherein at lease some of the sensor units and some of the further sensor units are arranged to receive the control signals from one of the first signal lines.

10. The panel according to claim 1, wherein each of the shift registers is arranged to receive a clock signal, and each of the shift registers comprises a latching unit operable in a first state and a second state, such that a shift register is configured to output a shift signal to a subsequent shift register in the series in response to a clock signal only when the latching unit in said shift register is operated in the second state, and wherein the latching unit is operable in the second state only when said shift register receives at least one sense signal from one of the second signal lines or the shift signal from a preceding shift register in the series.

11. A method for touch sensing, comprising:
connecting a plurality of shift registers in a series, each shift register arranged to receive a clock signal; and
coupling a plurality of sensor units to the shift registers through a plurality of signal lines, the sensor units arranged in a two-dimensional array to sense a touch event, wherein each of the signal lines is connected to one of the shift registers such that the shift registers connected to two adjacent signal lines are separated by at least another one of the shift registers, wherein each sensor unit is arranged to provide a first signal indicative of the touch event through one of the signal lines, with each of the signal lines connected to two or more of the sensor units, and wherein each of the shift registers comprises a latching unit operable in a first state and a second state, such that a shift register is configured to output a second signal to a subsequent shift register in the series in response to the clock signal only when the latching unit in said shift register is operated in the second state, and wherein the latching unit is operable in the second state only when said shift register receives at least one of the first signal from one of the signal lines or the second signal from a preceding shift register in the series.

12. The method according to claim 11, wherein each shift register comprises an output end for outputting the second signal, said method further comprising:
applying a series of the clock signals to each of the shift registers;
obtaining an output signal from the output end of one of last shift registers in the series in response to said clock signals; and
determining the touch event from the output signal.

13. The method according to claim 12, wherein the sensor units are configured to receive control signals from a plurality of control lines, and the sensor units are arranged in an array comprising a plurality of columns and a plurality of rows, such that each row of the sensor units in the array is arranged to receive the control signals from a different one of the control lines, and wherein the first signal indicative of the touch event is provided only in response to a control signal, said method further comprising:
sequentially providing the control signal to each of the control lines so as to determine the touch event associated with each row of the sensor units in a sequential manner.

14. The method according to claim 13, wherein the sensor units are arranged on a display panel comprising a plurality of display pixels comprising in a plurality of pixel rows and the display pixels in a pixel row are controlled by the control signals from one of the control lines.

15. The method according to claim 11, wherein the plurality of sensor units are arranged on a panel in an array defining a plurality of coordinates; and the first state and the second state of the latching units in the shift registers in the series are configured to provide touch data indicative of a coordinate of the touch event, and wherein the series has a series end, said method further comprising:
providing a plurality of the clock signals to each of the shift registers for shifting the touch data toward the series end; and
obtaining the touch data from the series end for determining the coordinate of the touch event.

16. A method for touch sensing, comprising:
arranging on a panel a plurality of display pixels and a plurality of first signal lines to convey control signals for controlling the display pixels;
providing a plurality of sensor units on the panel, the sensor units configured to receive the control signals from the first signal lines; and
arranging on the panel a plurality of second signal lines, the second signal lines electrically connected to a sensor module, the sensing module comprises a plurality of shift registers connected in series, wherein each of the sensor units is configured to provide a sense signal to the sensing module via one of the second signal lines, the sense signal indicative of a touch event, and wherein each for the second signal lines is connected to one of the shift registers such that the shift registers connected to two adjacent second signal lines are separated by at least another one of the shift registers, and wherein the sensor units are arranged in a two-dimensional array, with each of the second signal lines connected to two or more of the sensor units, and only one or some of the shift registers connected to the second signal lines are configured to receive the sense signal at a given time so that position of each of said one or some shift registers in the sensing module can be used to identify one or more touch locations on the array.

17. The method according to claim 16, wherein the display pixels are arranged in a plurality of pixel rows and the display pixels in a pixel row are arranged to receive a control signal from one of the first signal lines and wherein the sense signal is caused by the touch event at a sensor unit and by the control signal in the first signal line associated with said sensor unit.

18. The method according to claim 16, further comprising;
arranging on the panel a plurality of further second signal lines electrically connected to the further sensing module; and
providing on the panel a plurality of further sensor units arranged to receive the control signals from the first signal lines, wherein each of the further sensor units is configured to provide a sense signal to the further sensing module via one of the further second signal lines, and wherein each for the further second signal lines is connected to one of the further shift registers such that the further shift registers connected to two adjacent further second signal lines are separated by at least another one of the further shift registers, wherein at least some of the sensor units and some of the further sensor units are arranged to receive a control signal from the same first signal line.

19. The method according to claim 16, wherein the panel comprises:
a first substrate; and
a second substrate separated from the first substrate, defining a gap therebetween, wherein the first signal lines and the second signal lines are provided to the first substrate, the first signal lines electrically isolated from the second signal lines, and wherein each sensor unit comprises an electrically conductive segment provided on the first substrate, such that the electrically conductive segment causes one of the first signal lines to make electrical contact with one of the second signal lines for providing the sense signal in response to a control signal from said one first signal line in a touch event.

20. The method according to claim 16, wherein each of the shift registers is arranged to receive a clock signal, and each of the shift registers comprises a latching unit operable in a first state and a second state, such that a shift register is configured to output a shift signal to a subsequent shift register in the series in response to a clock signal only when the latching unit in said shift register is operated in the second state, and wherein the latching unit is operable in the second state only when said shift register receives at least one sense signal from one of the second signal lines or the shift signal from a preceding shift register in the series.

* * * * *